(12) United States Patent
Xu et al.

(10) Patent No.: US 11,906,835 B2
(45) Date of Patent: Feb. 20, 2024

(54) TOUCH DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Zuzhao Xu, Hubei (CN); Xiaoxia Zhang, Hubei (CN)

(73) Assignee: WUHAN CHINA OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 108 days.

(21) Appl. No.: 17/611,233

(22) PCT Filed: Oct. 13, 2021

(86) PCT No.: PCT/CN2021/123539
§ 371 (c)(1),
(2) Date: Nov. 15, 2021

(87) PCT Pub. No.: WO2023/050480
PCT Pub. Date: Apr. 6, 2023

(65) Prior Publication Data
US 2023/0096095 A1    Mar. 30, 2023

(30) Foreign Application Priority Data
Sep. 28, 2021 (CN) .......................... 202111145107.1

(51) Int. Cl.
*G02F 1/1333* (2006.01)
*G06F 3/041* (2006.01)

(52) U.S. Cl.
CPC ........ *G02F 1/13338* (2013.01); *G06F 3/0412* (2013.01); *G06F 3/04164* (2019.05)

(58) Field of Classification Search
CPC . G06F 3/04164; G06F 3/0412; G02F 1/13338
See application file for complete search history.

(56) References Cited

U.S. PATENT DOCUMENTS

2016/0105952 A1* 4/2016 Park ..................... G02F 1/13338
349/12
2016/0364068 A1* 12/2016 Cheng ................... G06F 3/0412
(Continued)

FOREIGN PATENT DOCUMENTS

CN        105549792 A    5/2016
CN        206039486 U    3/2017
(Continued)

OTHER PUBLICATIONS

International Search Report in International application No. PCT/CN2021/123539,dated Jun. 24, 2022.
(Continued)

*Primary Examiner* — Peter D McLoone
(74) *Attorney, Agent, or Firm* — Mark M. Friedman

(57) ABSTRACT

A touch display panel and a display device utilize one thin film transistor is configured for one touch wiring. The thin film transistor is turned on during the lighting test and a corresponding electrical signal is input, which can change the floating state of the touch wiring. The coupling effect between the touch wiring and a data line can be reduced or eliminated, which reduces interference with a data signal, so that bright-line phenomenon caused by the floating touch wiring interfering with the data line during the lighting test can be improved or eliminated.

12 Claims, 3 Drawing Sheets

(56) References Cited

U.S. PATENT DOCUMENTS

2018/0157366 A1   6/2018  Du
2021/0225216 A1   7/2021  Wang et al.

FOREIGN PATENT DOCUMENTS

| CN | 106909253 A | 6/2017 |
| CN | 107037928 A | 8/2017 |
| CN | 110673766 A | 1/2020 |
| CN | 111781540 A | 10/2020 |
| CN | 112436047 A | 3/2021 |
| CN | 113076028 A | 7/2021 |

OTHER PUBLICATIONS

Written Opinion of the International Search Authority in International application No. PCT/CN2021/123539, dated Jun. 24, 2022.
Chinese Office Action issued in corresponding Chinese Patent Application No. 202111145107.1 dated Apr. 14, 2023, pp. 1-7.

\* cited by examiner

TOUCH DISPLAY PANEL AND DISPLAY DEVICE

CROSS REFERENCE OF RELATED APPLICATION

This application is a US national phase application based upon an International Application No. PCT/CN2021/123539, filed on Oct. 13, 2021, which claims the priority of Chinese Patent Application No. 202111145107.1, entitled "TOUCH DISPLAY PANEL AND DISPLAY DEVICE", filed on Sep. 28, 2021, the disclosures of which are incorporated herein by reference in its entirety.

FIELD OF THE DISCLOSURE

The present disclosure relates to a field of display technology, and more particularly to a touch display panel and a display device.

BACKGROUND

A touch display panel 1 as shown in FIG. 1 and FIG. 2 comprises a plurality of data line groups DLG and a plurality of touch wiring groups TPLG which are arranged alternately in sequence and further comprises a plurality of lighting test signal lines CTL. Each of the data line groups DLG comprises at least one data line DL, and each of the touch wire groups TPLG comprises at least one touch wirings TPL. In the direction of the thickness of the touch display panel 1, the projection of the plurality of lighting test signal lines CTL at least partially overlap the projection of the plurality of touch wiring groups TPLG.

During the lighting test of the touch display panel 1, since there is no bound driver chip, the touch wirings TPL and the data lines DL do not receive corresponding signals output by a driver chip, and the data lines DL and the lighting test signal lines CTL needs to receive corresponding signals provided by a lighting test circuit for lighting test. At this time, since the touch wirings TPL do not receive signals and are in a floating state, the lighting test signal lines CTL cross or couple with the touch wirings TPL in the direction of the thickness of the touch display panel 1, so the touch wirings TPL have corresponding potentials due to the coupling. Coupling is also formed between the touch wirings TPL and the data lines DL, thereby interfering with the data signals transmitted on the data lines DL, which results that bright lines 2 appear at fixed positions where red pictures and blue pictures are shown on the touch display panel 1 as shown in FIG. 2. This will cause the lighting test (CT) to fail in normal judgement. If the case where the bright lines 2 appears is ignored, the actual broken wires may be missed, and these broken wires will affect the display quality.

The above introduction of the background technology is only for clear and complete understanding of the technical solutions of the present disclosure. Therefore, it cannot be considered that the above involved technical solutions are known to those skilled in the art just because they appear in the background of the present disclosure.

SUMMARY

Thus, the present disclosure provides a touch display panel and a display device for improving the technical problem of bright lines caused by floating touch wiring TPL interfering with data lines during lighting test.

In a first aspect, the present disclosure provides a touch display panel comprising a plurality of touch wiring groups and a plurality of thin film transistors. Each touch wiring group comprises at least one touch wiring extending along a first direction. One terminal of at least one thin film transistor is electrically connected to the corresponding touch wiring. The one terminal is one of a source and a drain.

According to one embodiment of the present disclosure, the touch display panel further comprises a plurality of data line group and a plurality of lighting test signal lines. The plurality of data line groups and plurality of touch wiring groups are alternately arranged in sequence along a second direction. Each data line group comprises at least one data line extending along the first direction. The plurality of lighting test signal lines extend along the second direction. In a third direction, projection of the plurality of lighting test signal lines at least partially overlapping projection of the plurality of touch wiring groups.

According to one embodiment of the present disclosure, the touch display panel further comprises a control signal line electrically connected to the plurality of thin film transistors, and a first input signal line electrically connected to at least part of other terminals of the plurality of thin film transistors, one of the other terminals being the other of the source and the drain.

According to one embodiment of the present disclosure, the touch display panel further comprises the first input signal line electrically connected to one part of the other terminals of the plurality of thin film transistors. The touch display panel further comprises a second input signal line, the second input signal line is electrically connected to another part of the other terminals of the plurality of thin film transistors.

According to one embodiment of the present disclosure, the touch display panel further comprises the touch wirings of the plurality of touch wiring groups comprise an odd touch wiring and an even touch wiring alternately arranged in sequence along the second direction. The first input signal line is connected to the odd touch wiring through the corresponding thin film transistor, the second input signal line is connected to the even touch wiring through the corresponding thin film transistor.

According to one embodiment of the present disclosure, the first input signal line and the second input signal line transmit constant voltage signal or square wave signal.

According to one embodiment of the present disclosure, the data line transmits data signal, and the square wave signal having a duty cycle the same as a duty cycle of the data signal.

According to one embodiment of the present disclosure, the control signal line comprises a first control wiring extending along the second direction, a second control wiring extending along the second direction, a third control wiring that extends along the second direction, a fourth control wiring extending along the first direction and electrically connected to the first control wiring, and a fifth control wiring extending along the first direction and electrically connected to the first control wiring, the second control wiring, and the third control wiring, the fourth control wiring and the fifth control wiring being arranged in sequence along the second direction. The first control wiring and the third control wiring are electrically connected to gates of the thin film transistors disposed in a side portion, and the second control wiring is electrically connected to gates of the thin film transistors disposed in a middle portion.

According to one embodiment of the present disclosure, a length of the second control wiring is greater than a length of the first control wiring.

According to one embodiment of the present disclosure, at least one of the first input signal line and the second input signal line comprises a first input wiring and a second input wiring extending from a side of the first input wiring. The first input wiring is electrically connected to the other terminals of the thin film transistors disposed in the side portion, and the second input wiring is electrically connected to the other terminals of the plurality of thin film transistors disposed in the middle portion.

According to one embodiment of the present disclosure, the touch display panel further comprises a substrate, a first metal layer located on one side of the substrate in the third direction, a second metal layer located on one side of the first metal layer away from the substrate in the third direction, and a third metal layer located on one side of the second metal layer away from the substrate in the third direction. The first metal layer comprises the even touch wiring, the fourth control wiring, the fifth control wiring, and a plurality of connection wirings. The gate of one thin film transistor is correspondingly connected to one of the third control wiring, the second control wiring, and the first control wiring through one connection wiring. The second metal layer comprises the odd touch wiring. The third metal layer comprises the first input signal line, the second input signal line, the first control wiring, the second control wiring, and the third control wiring.

According to one embodiment of the present disclosure, in the first direction, a wiring structure of the first input signal line and a wiring structure of the second input signal line are symmetrical with respect to the second control wiring, and in the first direction, the first input signal line and the second input signal line are located between the first control wiring and the third control wiring.

According to one embodiment of the present disclosure, a width of the first input signal line is equal to a width of the second input signal line, the width of the first input signal line is greater than a width of the control signal line, the width of the control signal line is greater than a width of the touch wiring.

In a second aspect, the present disclosure provides a display device comprising the touch display panel of any of the above embodiments. The first direction is interlaced with the second direction and the third direction is perpendicular to the first direction and the second direction.

In the touch display panel and the display device provided by the represent disclosure, one thin film transistor is configured for one touch wiring, and then the thin film transistor is turned on during the lighting test and a corresponding electrical signal is input, which can change the floating state of the touch wiring. Thus, the coupling effect between the touch wiring and a data line can be reduced or eliminated, which reduces interference with a data signal, so that bright-line phenomenon caused by the floating touch wiring interfering with the data line during the lighting test can be improved or eliminated.

DETAILED DESCRIPTION

Figure 1:
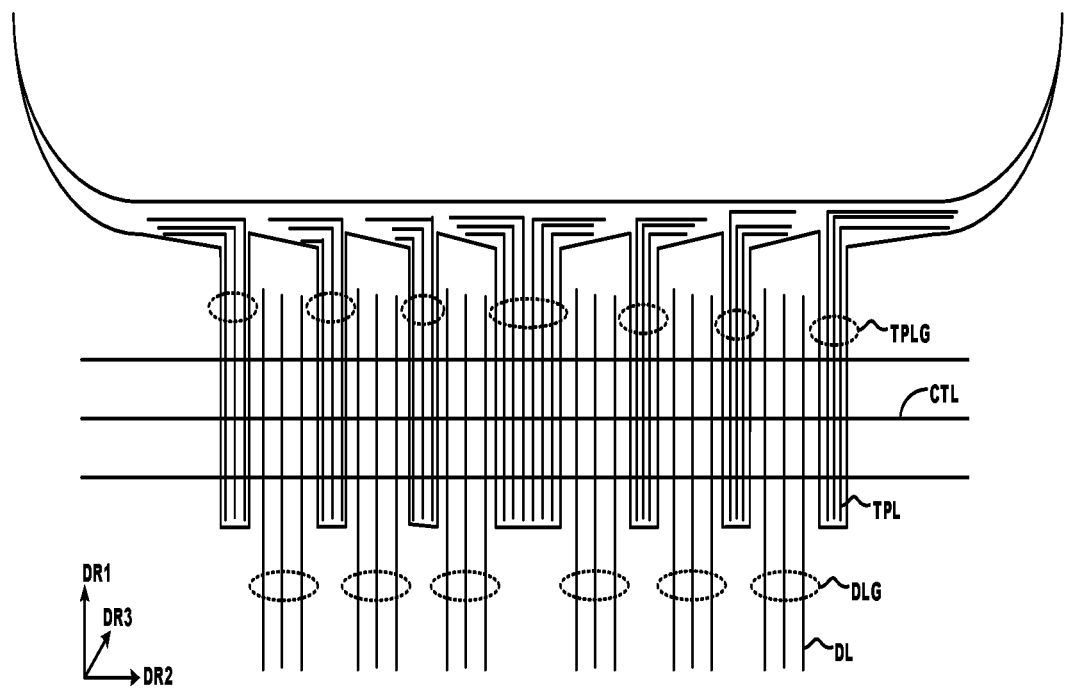
FIG. 1 is a schematic diagram of a structure of a conventional touch display panel.
Figure 2:
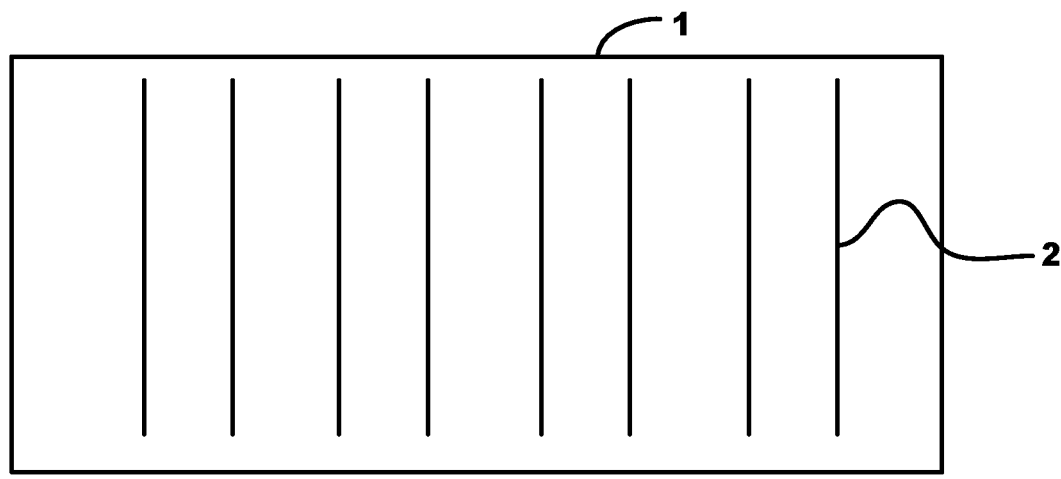
FIG. 2 is a schematic diagram of display effect of the touch display panel shown in FIG. 1 during a lighting test.

Embodiments of the present disclosure are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present disclosure, and are not to be construed as limiting the scope of the present disclosure.

Figure 3:
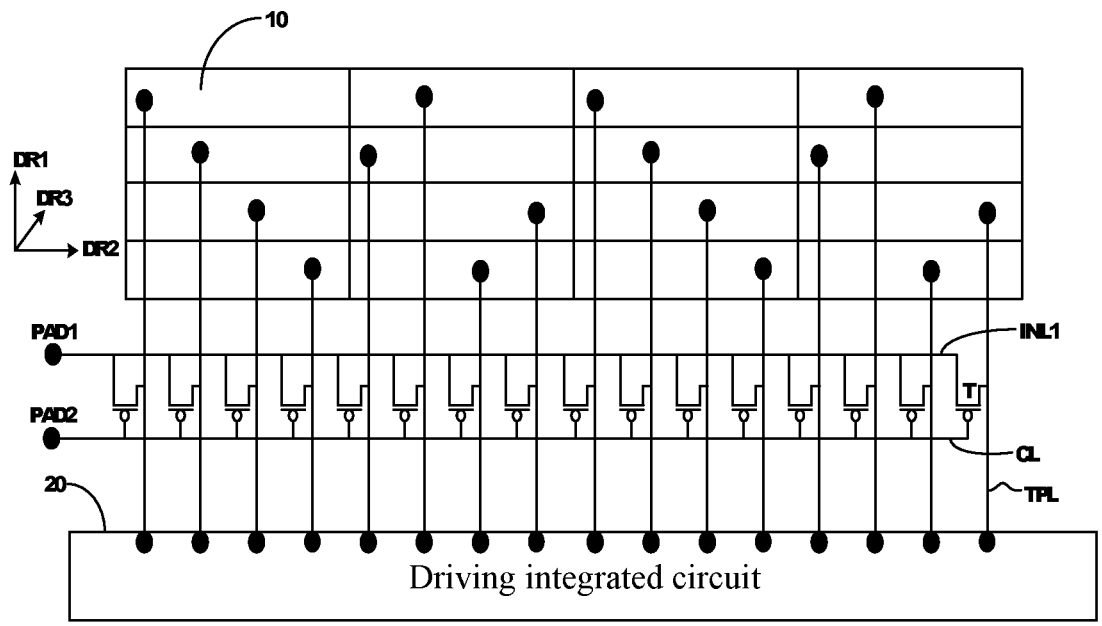
FIG. 3 is a schematic diagram of a structure of a touch display panel provided by an embodiment of the present disclosure.
Figure 4:
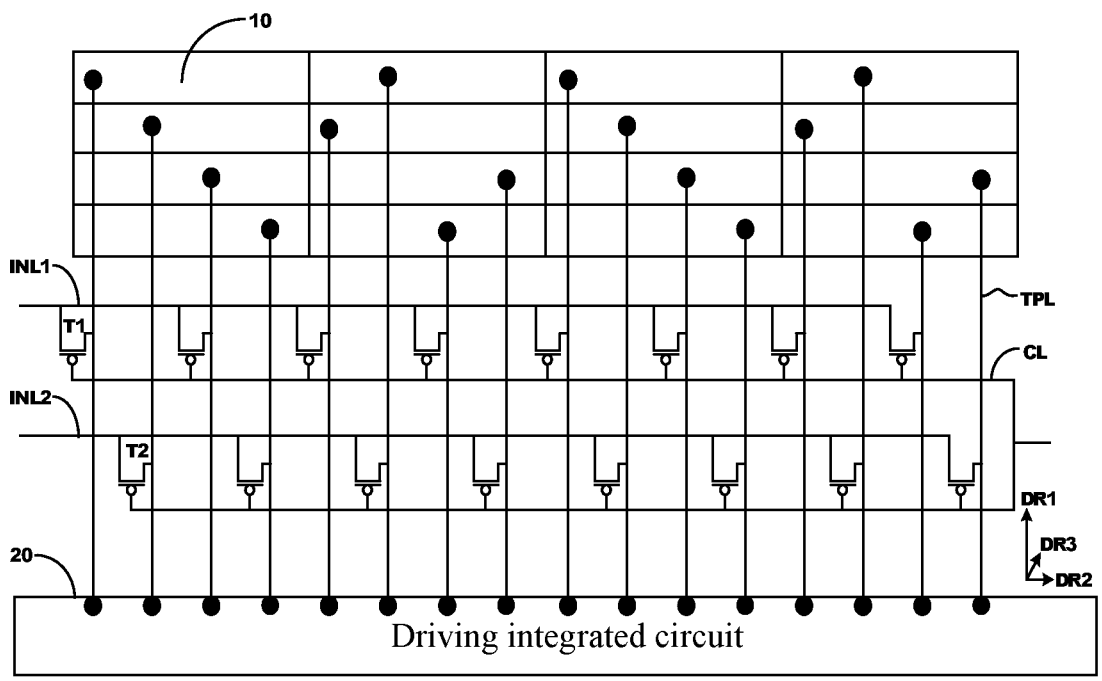
FIG. 4 is a schematic diagram of another structure of a touch display panel provided by an embodiment of the present disclosure.

As shown in FIG. 1, FIG. 3, or FIG. 4, an embodiment provides a touch display panel, which comprises a plurality of touch wiring groups TPLG and a plurality of thin film transistors. Each touch wiring group TPLG comprises at least one touch wiring TPL which extends along a first direction DR1. One terminal of one thin film transistor is electrically connected to one touch wiring TPL, and another terminal thereof is one of a source and a drain.

In the touch display panel provided by the embodiment, one thin film transistor is configured for one touch wiring TPL, and then the thin film transistor is turned on during the lighting test and a corresponding electrical signal is input, which can change the floating state of the touch wiring TPL. Thus, the coupling effect between the touch wiring TPL and a data line DL can be reduced or eliminated, which reduces interference with a data signal, so that bright-line phenomenon caused by the floating touch wiring TPL interfering with the data line DL during the lighting test can be improved or eliminated.

The plurality of thin film transistors T can be N-channel thin film transistors. During the lighting test, the gates of the thin film transistors receive high-potential signals to input electrical signals to the corresponding touch wirings TPL, which can avoid that the capacitive reactance and/or impedance of the data lines DL adjacent to the touch wirings TPL in a second direction DR2 change suddenly, thereby reducing the interference with the data signals. During the normal use of the touch display panel, the normal transmission function of the touch wirings TPL can be realized by removing the high-potential signals and/or electrical signals. The plurality of thin film transistors can be P-channel thin film transistors. During the lighting test, the gates of the thin film transistors receive low-potential signals to input electrical signals to the corresponding touch wirings TPL, which can avoid that the capacitive reactance and/or impedance of the data lines DL adjacent to the touch wirings TPL in the second direction DR2 change suddenly, thereby reducing the interference with the data signals. During the period when the touch display panel is used normally, the normal transmission function of the touch wirings TPL can be realized by removing the low-potential signals and/or electrical signals.

The plurality of thin film transistors may be polysilicon thin film transistors, and specifically may be low temperature polysilicon thin film transistors. The plurality of thin film transistors may alternatively be oxide thin film transistors.

The touch display panel further comprises a plurality of data line groups DLG and a plurality of lighting test signal lines CTL. Each data line group DLG comprises at least one data line DL extending along the first direction DR1. The touch display panel further comprises a plurality of touch wiring groups TPLG. The plurality of touch wiring groups TPLG and the plurality of data line groups DLG are alternately arranged in sequence along the second direction DR2. The plurality of lighting test signal lines CTL extend along the second direction DR2, and in a third direction DR3, the projection of the plurality of lighting test signal lines CTL at least partially overlap the projection of the plurality of touch wiring groups TPLG.

As shown in FIG. 3, the touch display panel further comprises a control signal line CL and a first input signal line INL1. The control signal line CL is electrically connected to the gates of the plurality of thin film transistors. The first input signal line INL1 is electrically connected to at least part of other terminals of the plurality of thin film transistors.

Wherein, the other terminals are sources or drains.

The touch display panel may further comprise a plurality of touch metal blocks 10 which are distributed in an array. One touch wiring TPL is electrically connected to one touch metal block 10.

The touch display panel may further comprise a control circuit, a first pad PAD1, and a second pad PAD2. An output terminal of the control circuit is electrically connected to the first input signal line INL1 through the first pad PAD1. Correspondingly, the control circuit can output an electrical signal to one of the source and drain of one thin film transistor. Another output terminal of the control circuit is electrically connected to the control signal line CL through the second pad PAD2. Correspondingly, the control circuit can output a high-potential signal or a low-potential signal to the gates of the plurality of thin film transistors.

The touch display panel also comprises a driving integrated circuit 20. The driving integrated circuit 20 comprises a plurality of touch output terminals and a plurality of display output terminals. One touch output terminal is electrically connected to one touch wiring TPL, and one display output terminal is electrically connected to one data line DL.

In the embodiment, the driving integrated circuit 20 adopted by the touch display panel may be a driving chip which integrates a display function and a touch function and may be applied to the touch display panel at a lower cost and in a smaller occupied space. Before the lighting test, the driver integrated circuit 20 has not been bound in the touch display panel. After the lighting test, the driver integrated circuit 20 is bound in the touch display panel, and its corresponding output terminals are electrically connected to the corresponding touch wirings TPL and data lines DL respectively provide corresponding touch signals and data signals to meet the touch display requirements of the touch display panel.

As shown in FIG. 4, the first input signal line INL1 is electrically connected to one part of the other terminals of the plurality of thin film transistors. The touch display panel further comprises a second input signal line INL2, and the second input signal line INL2 is electrically connected to the other part of the other terminals of plurality of the transistors.

In the embodiment, different electrical signals can be applied to two parts of the touch wirings TPL, which not only can ensure that the capacitive reactance and/or impedance of the data lines DL adjacent to the touch wirings TPL does not change suddenly, but also can configure the two parts of the touch wirings TPL to transmit different electrical signals to better shield the influence on the potential of the data lines DL.

The touch wirings TPL in the plurality of touch wiring groups TPLG comprise odd touch wirings TPL and even touch wirings TPL alternately arranged in sequence along the second direction DR2. The first input signal line INL1 is connected to the odd touch wirings TPL through the corresponding thin film transistors, and the second input signal line INL2 is connected to the even touch wirings TPL through the corresponding thin film transistors.

For example, the first input signal line INL1 is connected to the first touch wiring TPL through the thin film transistor T1, and the second input signal line INL2 is connected to the second touch wiring TPL through the thin film transistor T2. Accordingly, the electrical signal transmitted on the first input signal line INL1 can be the same as the electrical signals transmitted on the odd touch wirings TPL, and the electrical signal transmitted on the second input signal line INL2 can be the same as the electrical signals transmitted on the even touch wirings TPL.

In the embodiment, the electrical signal applied to the odd touch wirings TPL can be different from the electrical signal applied to the even touch wirings TPL, which not only can ensure that the capacitive reactance and/or impedance of the data lines DL adjacent to the touch wirings TPL does not change suddenly, but also can configure the two parts of the touch wirings TPL to transmit different electrical signals to better shield the influence on the potential of the data lines DL.

The first input signal line INL1 and/or the second input signal line INL2 is used to transmit a constant voltage signal or a square wave signal. The constant voltage signal or the square wave signal induces less coupling effect on the data signal and also has less effect on the sudden change in the capacitive reactance and/or impedance of the data lines DL adjacent to the touch wirings TPL.

The data lines DL are used to transmit data signals. The duty cycle of the square wave signal is the same as or similar to the duty cycle of the data signals. The square wave signal with the same or similar duty cycle of the data signals can induce less coupling effect on the data signals and has less effect on the sudden change in the capacitive reactance and/or impedance of the data lines DL adjacent to the touch wirings TPL.

The first input signal line INL1 can receive one of the constant voltage signal and the square wave signal having the duty cycle the same as/similar to the duty cycle of the data signals, and the second input signal line INL2 can receive the other of the constant voltage signal and the square wave signal having the duty cycle the same as/similar to the duty cycle of the data signals. Wherein, the constant voltage signal may be a constant voltage high-potential signal.

Figure 5:
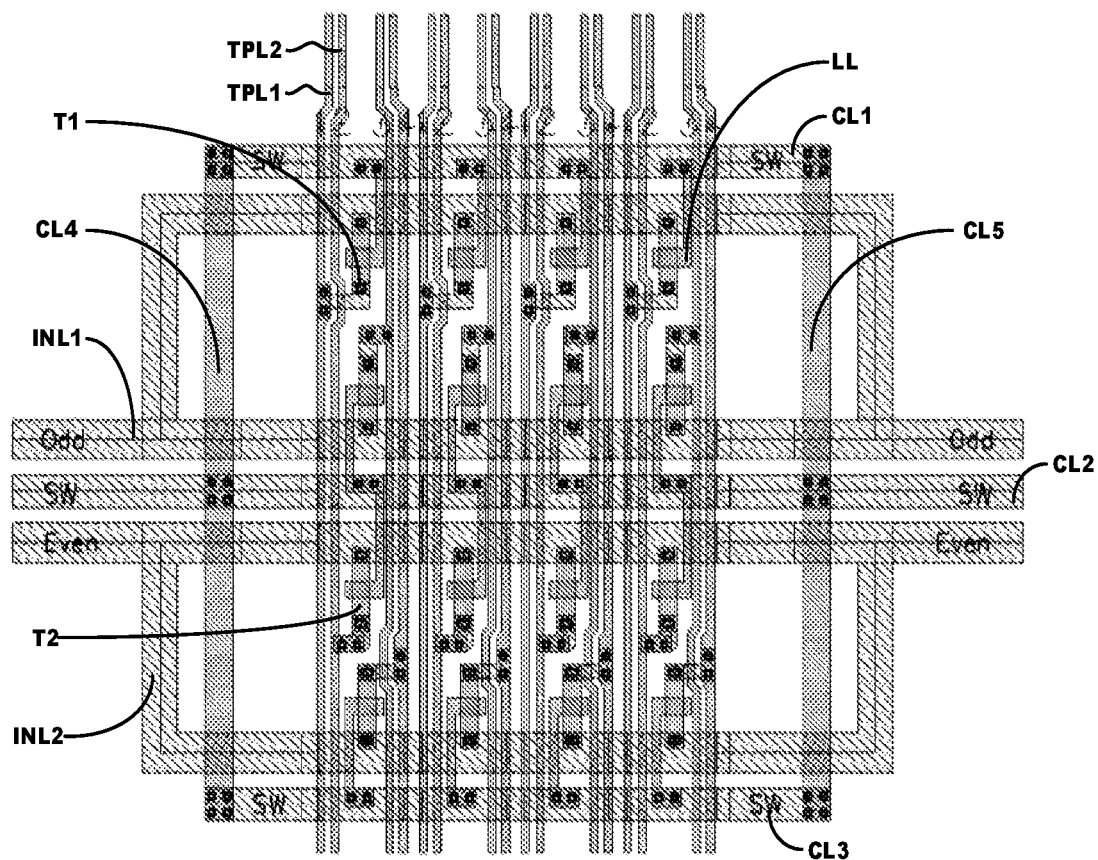
FIG. 5 is a schematic diagram of a layout structure of the touch display panel shown in FIG. 4.

As shown in FIG. 5, the control signal line CL comprises a first control line CL1, a second control line CL2, a third control line CL3, a fourth control line CL4, and a fifth control line CL5. The first control line CL1 extends along the second direction DR2, the second control line CL2 extends along the second direction DR2, the third control line CL1 extends along the second direction DR2. The third control wiring CL3, the second control wiring CL2, and the first control wiring CL1 are arranged in sequence along the first direction DR1. The fourth control wiring CL4 extends along the first direction DR1 and is electrically connected to the first control wiring CL1, the second control wiring CL2, and the third control wiring CL3. The fifth control wiring CL5 extends along the first direction DR1, and is electrically connected to the first control wiring CL1, the second control wiring CL2, and the third control wiring CL3. The fourth control wiring CL4 and the fifth control wiring CL5 are arranged in sequence along the second direction DR2. Wherein, the first control wiring CL1 and the third control wiring CL3 are electrically connected to the gates of the thin film transistors disposed in the side portion, and the second control wiring CL2 is electrically connected to the gates of the thin film transistors disposed in the middle portion.

The first control wiring CL1, the third control wiring CL3, the fourth control wiring CL4, and the fifth control wiring CL5 are sequentially connected in an end-to-end pattern to form a rectangular body, and the plurality of thin film transistors are enclosed in the rectangular body. The plurality of thin film transistors are arranged in an array which totally comprises four rows and several columns, wherein each column comprises two thin film transistors. The odd touch wirings TPL may comprise the J-th touch wiring TPL, for example, the first touch wiring TPL1, wherein J is an odd number. The even touch wirings TPL may comprise the Kth touch wiring TPL, for example, the second touch wiring TPL2, wherein K is an even number. One of the source and the drain of the thin film transistor T1 is connected to the first touch wiring TPL1, and one of the source and the drain of the thin film transistor T2 is connected to the second touch wiring TPL2.

The gates of the plurality of thin film transistors are correspondingly connected to one of the first control wiring CL1, the second control wiring CL2, and the third control wiring CL3. It can be understood that this arrangement can save the occupied space of the touch display panel.

The length of the second control wiring CL2 is greater than the length of the first control wiring CL1. The length of the third control wiring CL3 is equal to the length of the first control wiring CL1.

At least one of the first input signal line INL1 and the second input signal line INL2 comprises a first input wiring and a second input wiring, and the second input wiring extends from a side of the first input wiring. The first input wiring is electrically connected to other terminals of the thin film transistors disposed in the side portion, and the second input wiring is electrically connected to other terminals of the plurality of thin film transistors disposed in the middle portion.

The first input wiring can be consistent with or parallel to the extension direction of the second control wiring CL2 and located on one side or both sides of the second control wiring CL2. The second input wiring can be a circular wiring with a curvature or a multi-segment polyline. The first input wiring is electrically connected to the second input wiring, thereby surrounding or enclosing at least one thin film transistor.

The touch display panel further comprises a substrate, a first metal layer, a second metal layer, and a third metal layer. The first metal layer is located on one side of the substrate in the third direction DR3. The first metal layer comprises the even touch wirings TPL, the fourth control wiring CL4, the fifth control wiring CL5, and a plurality of connection wirings LL. The gate of one thin film transistor is correspondingly connected to one of the third control wiring CL3, the second control wiring CL2, and the first control wiring CL1 through one connecting wiring LL. The second metal layer is located on one side of the first metal layer away from the substrate in the third direction DR3. The second metal layer comprises the odd touch wirings TPL.

The third metal layer is located on one side of the second metal layer away from the substrate in the third direction DR3. The third metal layer comprises the first input signal line INL1, the second input signal line INL2, the first control wiring CL1, the second control wiring CL2, and the third control wiring CL3.

A corresponding insulating layer can be arranged between two adjacent metal layers to achieve electrical isolation between the two adjacent metal layers.

In the first direction DR1, the wiring structure of the first input signal line INL1 and the wiring structure of the second input signal line INL2 are symmetrical with respect to the second control wiring. In the first direction DR1, the first input signal line INL1 and the second input signal line INL2 are located between the first control wiring CL1 and the third control wiring CL3.

The width of the first input signal line INL1 is equal to the width of the second input signal line INL2. The width of the first input signal line INL1 is greater than the width of the control signal line CL. The width of the control signal line CL is greater than the width of the touch wirings TPL.

The touch display panel comprises a display region and a non-display region. At least part of the plurality of touch wiring groups TPLG extending along the first direction DR1 and at least part of the plurality of data line groups DLG extending along the first direction DR1 are located in the non-display region. The plurality of thin film transistors, the plurality of lighting test signal lines CTL, the control signal line CL, the first input signal line INL1, and the second input signal line INL2 are all located in the non-display region. Wherein, the non-display region can be, but not limited to, the bottom border area, and can also be disposed in other non-display region as needed.

The embodiment provides a display device which comprises the touch display panel in any of the above embodiments. The first direction DR1 is interlaced with the second direction DR2, and the third direction DR3 is the thickness direction of the touch display panel, or the third direction DR3 is perpendicular to the first direction DR1 and the second direction DR2.

In the touch display panel provided by the embodiment, one thin film transistor is configured for one touch wiring TPL, and then the thin film transistor is turned on during the lighting test and a corresponding electrical signal is input, which can change the floating state of the touch wiring TPL. Thus, the coupling effect between the touch wiring TPL and a data line DL can be reduced or eliminated, which reduces interference with a data signal, so that bright-line phenomenon caused by the floating touch wiring TPL interfering with the data line DL during the lighting test can be improved or eliminated.

For a person of ordinary skill in the art, equivalent substitutions or changes can be made according to the technical solution of the present disclosure and its inventive concept, and all these changes or substitutions shall fall within the protection scope of the appended claims of the present disclosure.

What is claimed is:
1. A touch display panel comprising:
  a plurality of touch wiring groups, each touch wiring group comprising at least one touch wiring extending along a first direction;
  a plurality of thin film transistors, one terminal of at least one of the plurality of thin film transistors being electrically connected to the corresponding touch wiring, the one terminal is one of a source and a drain;

a plurality of data line groups, the plurality of data line groups and plurality of touch wiring groups being alternately arranged in sequence along a second direction, each data line group comprising at least one data line extending along the first direction;

a plurality of lighting test signal lines, the plurality of lighting test signal lines extending along the second direction, and, in a third direction, projection of the plurality of lighting test signal lines at least partially overlapping projection of the plurality of touch wiring groups;

a control signal line electrically connected to the plurality of thin film transistors;

a first input signal line electrically connected to at least part of other terminals of the plurality of thin film transistors, one of the other terminals being the other of the source and the drain; and a second input signal line, electrically connected to another part of the other terminals of the plurality of thin film transistors, wherein the touch wirings of the plurality of touch wiring groups comprise an odd touch wiring and an even touch wiring alternately arranged in sequence along the second direction, the first input signal line is connected to the odd touch wiring through the corresponding thin film transistor, the second input signal line is connected to the even touch wiring through the corresponding thin film transistor.

2. The touch display panel of claim 1, wherein the first input signal line and the second input signal line transmit constant voltage signal or square wave signal.

3. The touch display panel of claim 2, wherein the data line transmits data signal, and the square wave signal having a duty cycle the same as a duty cycle of the data signal.

4. The touch display panel of claim 1, wherein the control signal line comprises:
a first control wiring extending along the second direction;
a second control wiring extending along the second direction;
a third control wiring extending along the second direction, the third control wiring, the second control wiring, and the first control wiring being arranged in sequence along the second direction;
a fourth control wiring extending along the first direction and electrically connected to the first control wiring, the second control wiring, and the third control wiring; and
a fifth control wiring extending along the first direction and electrically connected to the first control wiring, the second control wiring, and the third control wiring, the fourth control wiring and the fifth control wiring being arranged in sequence along the second direction,
wherein the first control wiring and the third control wiring are electrically connected to gates of the thin film transistors disposed in a side portion, and the second control wiring is electrically connected to gates of the thin film transistors disposed in a middle portion.

5. The touch display panel of claim 4, wherein a length of the second control wiring is greater than a length of the first control wiring.

6. The touch display panel of claim 4, wherein at least one of the first input signal line and the second input signal line comprises:
a first input wiring; and
a second input wiring extending from a side of the first input wiring,
wherein the first input wiring is electrically connected to the other terminals of the thin film transistors disposed in the side portion, and the second input wiring is electrically connected to the other terminals of the plurality of thin film transistors disposed in the middle portion.

7. The touch display panel of claim 4, further comprising:
a substrate;
a first metal layer located on one side of the substrate in the third direction, the first metal layer comprising the even touch wiring, the fourth control wiring, the fifth control wiring, and a plurality of connection wirings, the gate of one thin film transistor being correspondingly connected to one of the third control wiring, the second control wiring, and the first control wiring through one connection wiring;
a second metal layer located on one side of the first metal layer away from the substrate in the third direction, the second metal layer comprising the odd touch wiring; and
a third metal layer located on one side of the second metal layer away from the substrate in the third direction, the third metal layer comprising the first input signal line, the second input signal line, the first control wiring, the second control wiring, and the third control wiring.

8. The touch display panel of claim 7, wherein in the first direction, a wiring structure of the first input signal line and a wiring structure of the second input signal line are symmetrical with respect to the second control wiring, and in the first direction, the first input signal line and the second input signal line are located between the first control wiring and the third control wiring.

9. The touch display panel of claim 1, wherein a width of the first input signal line is equal to a width of the second input signal line, the width of the first input signal line is greater than a width of the control signal line, the width of the control signal line is greater than a width of the touch wiring.

10. A display device comprising a touch display panel, the touch display panel comprising:
a plurality of touch wiring groups, each touch wiring group comprising at least one touch wiring extending along a first direction;
a plurality of thin film transistors, one terminal of at least one of the plurality of thin film transistors being electrically connected to the corresponding touch wiring, the one terminal is one of a source and a drain, wherein the first direction is interlaced with the second direction and the third direction is perpendicular to the first direction and the second direction;
a plurality of data line groups, the plurality of data line groups and plurality of touch wiring groups being alternately arranged in sequence along a second direction, each data line group comprising at least one data line extending along the first direction;
a plurality of lighting test signal lines, the plurality of lighting test signal lines extending along the second direction, and, in a third direction, projection of the plurality of lighting test signal lines at least partially overlapping projection of the plurality of touch wiring groups;
a control signal line electrically connected to the plurality of thin film transistors;
a first input signal line electrically connected to at least part of other terminals of the plurality of thin film transistors, one of the other terminals being the other of the source and the drain; and a second input signal line, electrically connected to another part of the other terminals of the plurality of thin film transistors, wherein the touch wirings of the plurality of touch wiring groups comprise an odd touch wiring and an even touch wiring alternately arranged in sequence along the second direction, the first input signal line is connected to the odd touch wiring through the corresponding thin film transistor, the second input signal line is connected to the even touch wiring through the corresponding thin film transistor.

11. The display device of claim 10, wherein the first input signal line and the second input signal line transmit constant voltage signal or square wave signal.

12. The display device of claim 11, wherein the data line transmits data signal, and the square wave signal having a duty cycle the same as a duty cycle of the data signal.

* * * * *